United States Patent [19]
Furukawa et al.

[11] Patent Number: 6,053,061
[45] Date of Patent: Apr. 25, 2000

[54] SLIDING FEED MECHANISM HAVING WORM GEAR

[76] Inventors: Ken'ichi Furukawa; Kouji Teranishi; Satoru Manabe, all c/o Mitsumi Electric Co., Ltd. of 8-8-2, Kokuryo-cho, Chofu-shi, Tokyo, Japan

[21] Appl. No.: 09/052,551

[22] Filed: Mar. 31, 1998

[30] Foreign Application Priority Data

Apr. 3, 1997 [JP] Japan ................................ 9-100885

[51] Int. Cl.$^7$ ........................ F16H 1/16; F16H 55/26
[52] U.S. Cl. .......................... 74/89.14; 74/411; 74/422; 74/425; 74/458; 74/89.17
[58] Field of Search .................... 74/89.14, 89.17, 74/411, 422, 425, 458

[56] References Cited

U.S. PATENT DOCUMENTS

| | | | |
|---|---|---|---|
| 2,245,240 | 6/1941 | Wittel | 74/425 |
| 2,651,212 | 9/1953 | Mackmann | 74/425 |
| 2,688,883 | 9/1954 | Schut | 74/425 |
| 2,842,976 | 7/1958 | Young | 74/425 |
| 3,079,808 | 3/1963 | Wildhaber | 74/458 |
| 4,257,286 | 3/1981 | Ohyama | 74/422 |
| 4,619,151 | 10/1986 | Trachman et al. | 74/89.14 X |
| 5,303,104 | 4/1994 | Aruga et al. | |

FOREIGN PATENT DOCUMENTS

| | | |
|---|---|---|
| 0 033 171A2 | 9/1989 | European Pat. Off. |
| 0 382 280 A1 | 1/1990 | European Pat. Off. |
| 0 529 589A2 | 3/1993 | European Pat. Off. |
| 0 688 975A1 | 6/1995 | European Pat. Off. |
| 196 16 976A1 | 10/1996 | Germany. |
| 2 033 048 | 5/1980 | United Kingdom. |

OTHER PUBLICATIONS

Patent Abstracts of Japan, Publication No. 05250821, Application No. 03191536, Pub. Date. Sep. 28, 1993.

*Primary Examiner*—Allan D. Herrmann
*Attorney, Agent, or Firm*—Patents & TMS, P.C.

[57] ABSTRACT

An improved sliding feed mechanism having a worm gear is disclosed can prevent a locking state from occurring between the worm and the worm wheel. The sliding feed mechanism includes a motor having a rotational shaft with an output end, a worm fixedly mounted to the rotational shaft and formed with a left-hand thread, a worm wheel which meshes with the worm, a driven member which is adapted to slidably move according to the rotation of the worm wheel. In this connection, the lead angle of the worm wheel is set so as to be larger than the lead angle of the worm, and the motor is mounted so that the output end of the rotational shaft is upwardly tilted so as to provide a proper engagement between the worm and the worm wheel having said lead angle.

20 Claims, 11 Drawing Sheets

6,053,061

SLIDING FEED MECHANISM HAVING WORM GEAR

BACKGROUND OF THE INVENTION

1. Field of the Invention

This invention relates to a sliding feed mechanism having a worm gear, and in particular relates to an improvement of a sliding feed mechanism for an optical pick-up used in an optical disc drive such as CD-ROM drives and CD-R drives and the like.

2. Description of the Prior Art

Sliding feed mechanisms having a worm gear comprised of a worm and a worm wheel are well known as one of the mechanisms for converting a rotational motion into a linear motion. Since such sliding feed mechanisms can obtain a large speed reduction ratio and noise generated therefrom is relatively small, such mechanisms are widely used in various machines.

For example, in disc drives such as CD-ROM drives, a sliding feed mechanism is used for moving an optical pick-up for reading out information recorded on the CD-ROM in a radial direction of the CD-ROM.

In general, the sliding feed mechanism used in the disc drive is roughly constructed from a DC motor capable of forward and reverse rotations, a worm which is mounted on a rotational shaft of the DC motor, a worm wheel which has a rotational axis orthogonal to the rotational shaft of the motor and meshes with the worm of the motor, a small-diameter pinion gear which rotates together with the worm wheel, a rack gear which is in engagement with the pinion gear, and a slider or a carriage (driven means) which is mounted to the rack gear and which is provided so as to be slidable in the axial direction of the rotational shaft of the motor along a guide rod in accordance with the movement of the rack gear. An optical pick-up is provided on the slider. With this construction, the optical pick-up moves in the radial directions of the optical disc by rotating the motor in either forward or reverse direction.

In such a sliding feed mechanism for moving the optical pick-up, a small DC motor with a low torque is used in order to reduce an amount of consumed electrical power and a space for installing the motor. Further, due to the necessity of fine control for the optical pick-up, a worm having a short pitch and a small lead angle is used in the worm gear of the sliding feed mechanism.

Meanwhile, in recent years, disc drives are improved so as to be able to rotate a disc at high speed such as 8 times speed, 12 times speed or more. In such disc drives in which the disc is rotated at such a high speed, it becomes necessary to increase accessing speed of the optical pick-up to a designated track, for example.

In order to increase the accessing speed, one approach is to increase rotational speed of a motor used in a sliding feed mechanism for an optical pick-up. However, this approach involves a problem in that an amount of current used for driving the motor becomes larger, which results in a large amount of consumed electrical power. Another approach is to increase an amount of movement of the optical pick-up per one rotation of the motor while reducing the number of rotation of the motor. However, this in turn creates a problem in that it becomes difficult to carry out fine control of the optical pick-up.

Further, in the prior art sliding feed mechanism for an optical pick-up, there is a case that the worm is locked up on the worm wheel when the optical pick-up is moved to the innermost position or the outermost position due to the size of the lead angle of the worm or the structure of the rack gear. Specifically, in these sliding feed mechanisms, when the optical pick-up is moved to the innermost position or the outermost position, the pick-up is restricted to move further, and in this state the worm wheel is normally no longer rotated further. However, at this state, if the worm is forcedly rotated by the motor, there is a case that slipping or the like would occur between the teeth of the worm and the teeth of the worm wheel engaged therewith to cause meshing interference between the worm and the worm wheel, which results in a locking state therebetween. In particular, in the sliding feed mechanisms for an optical pick-up, since a worm having a short pitch and a small lead angle is used as described above, such a locking state is likely to occur.

If such a locking state would occur, there is a case that the worm can not be returned to the normal engaging condition from the locking state since the motor can not be rotated in the reverse direction because of the small-size low torque motor being used in the sliding feed mechanism as described above.

In order to prevent such a locking state from occurring, it is the easiest way to enlarge the lead angles of the worm and the worm wheel, and this can be achieved by either increasing the number of threads of the worm or reducing the pitch circle thereof. However, this in turn creates a problem in that an amount of the movement of the optical pick-up per one rotation of the rotational shaft of the motor becomes too large, which makes it difficult to perform fine control for the optical pick-up.

SUMMARY OF THE INVENTION

The present invention has been made in view of the problems involved in the prior art sliding feed mechanisms. Accordingly, it is an object of the present invention is to provide a sliding feed mechanism having a worm gear in which the locking state described is not likely to occur and, even if such a locking state would occur, the worm gear can be easily restored from the locking state.

In order to achieve the object, the present invention is directed to a sliding feed mechanism having a worm gear, which comprises:

a motor including a rotational shaft having an output end;

a worm fixedly mounted to the rotational shaft and formed with a left-hand thread;

a worm wheel which meshes with the worm;

a driven means which is adapted to slidably move according to the rotation of the worm wheel, wherein the lead angle of the worm wheel is set so as to be larger than the lead angle of the worm, and the motor is mounted so that the output end of the rotational shaft is upwardly tilted so as to provide a proper engagement between the worm and the worm wheel having said lead angle.

Another aspect of the present invention is directed to a sliding feed mechanism having a worm gear, which comprises:

a motor having a rotational shaft;

a worm fixedly which is mounted to the rotational shaft and has a predetermined lead angle;

a worm wheel which has a lead angel larger than the predetermined lead angle of the worm and meshes with the worm;

a pinion gear integrally provided on the worm wheel; and a driven means having a rack gear which is in mesh with the pinion gear and which is adapted to slidably move according to the rotation of the worm wheel, wherein the motor is mounted with the rotational shaft being tilted for an angle which is substantially equal to the difference between the lead angle of the worm and the lead angle of the worm wheel.

According to the sliding feed mechanism of the present invention, the worm wheel has a large lead angle and the worm can also have an apparent large lead angle to such an extent that the rotational shaft is tilted. With this result, it is possible to enlarge the lead angle of the worm wheel easily without changing the amount of the movement of the driven means such as an optical pick-up per one rotation of the rotational shaft of the motor, thereby enabling to effectively prevent locking form occurring between the worm and the worm wheel.

The other aspect of the present invention is directed to a sliding feed mechanism having a worm gear, which comprises:

a motor having a rotational shaft;

a worm fixedly mounted to the rotational shaft of the motor;

a worm wheel which meshes with the worm;

a pinion gear coaxially provided with the worm wheel; and a driven means having a rack gear which meshes with the pinion gear and which is adapted to slidably move according to the rotation of the worm wheel, wherein said rack gear is formed so as to be deformable.

According to the sliding feed mechanism as described above, even if the worm wheel is forcedly rotated by the worm at either of the opposite ends of the movable range of the worm wheel with respect to the rack gear, such forced rotation of the worm wheel can be absorbed by the deformation of the rack gear, thus enabling to prevent a locking state from occurring between the worm and the worm wheel.

In this case, it is preferred that the rack gear is formed of an elastic material, and said rack gear having opposite ends and arms supporting the opposite ends.

Other objects, structures and advantages of the present invention will be apparent when the following detailed description of the preferred embodiment will be considered taking in conjunction with the accompanying drawings.

BRIEF DESCRIPTION OF THE DRAWINGS

FIG. 9 are illustrations which show different meshing conditions between a worm and a worm wheel used in the sliding feed mechanism, in which

DETAILED DESCRIPTION OF THE PREFERRED EMBODIMENTS

A detailed description of the preferred embodiments of a sliding feed mechanism having a worm gear according to the present invention will now be given below with reference to the appended drawings. In this regard, it is to be noted that although the embodiments are described with reference to the case where the sliding feed mechanism of the present invention is applied to a disc drive such as CD-ROM drive or CD-R drive, the present invention is not limited to the sliding feed mechanism to be used in such disc drives.

Figure 1:
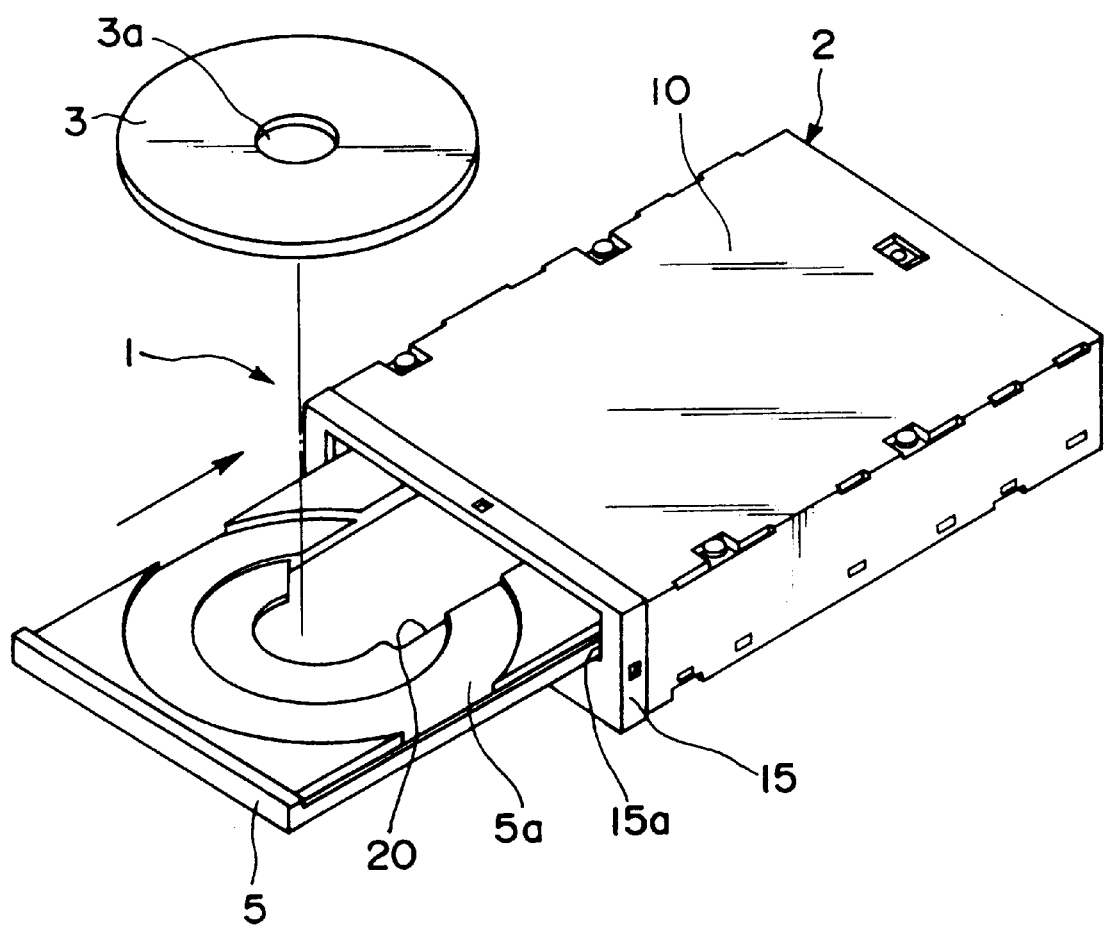
FIG. 1 is a perspective view which shows an external view of a disc drive to which a sliding feed mechanism according to the present invention is applied.

A disc drive 1 shown in FIG. 1 is a CD-R drive, and the present invention is applied to a sliding feed mechanism for an optical pick-up used in the CD-R drive. As shown in FIG. 1, the disc drive 1 is roughly constructed from a main body 2 and a disc tray 5 which is movable in the forward and backward direction (horizontal direction) with respect to the main body 2 for transporting an optical disc 3 such as CD-R or CD.

The main body 2 is roughly constructed from a circuit board assembly (not shown in the drawings), a mechanism assembly 13 provided on the circuit board assembly and a casing 10 which houses the circuit board assembly and the mechanism assembly 13. The casing 10 is formed from thin metal plates. Further, at the front portion of the casing 10, a front panel 15 having an opening 15a is attached.

Figure 2:
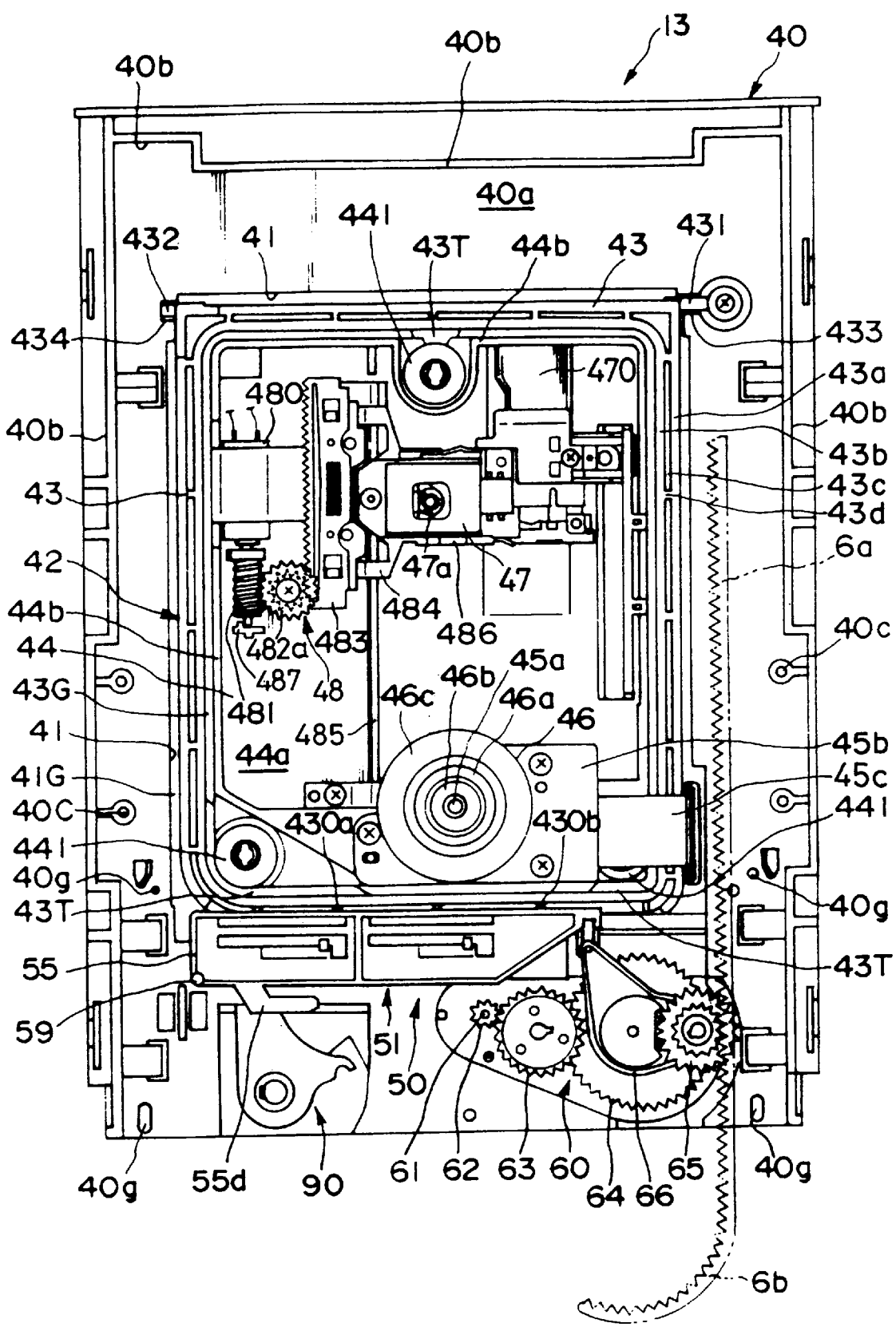
FIG. 2 is a planar view of a main body of the disc drive from which a casing is removed, in which a mechanism unit is shown in a lowered position.
Figure 3:
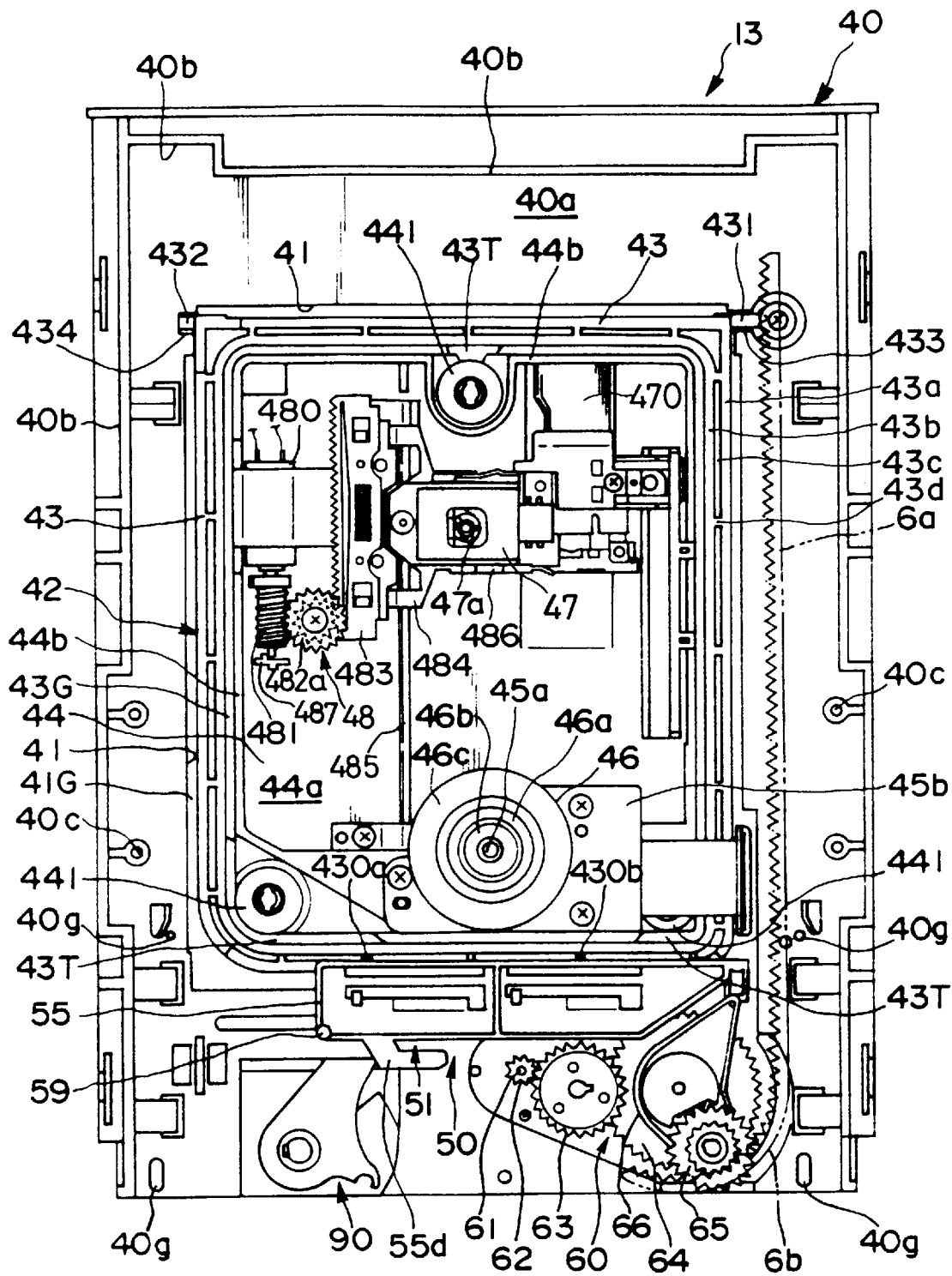
FIG. 3 is another planar view of the main body of the disc drive from which the casing is removed, in which the mechanism unit is shown in a raised position.

FIG. 2 is a planar view of the main body 2 of the above described disc drive from which the casing 10 is removed, in which a mechanism unit is shown in a lowered position (lower position), FIG. 3 is another planar view of the main body 2, in which the mechanism unit is shown in a raised position (upper position).

As shown in FIGS. 2 and 3, the mechanism assembly 13 housed in the casing 10 is provided with a chassis 40 which is preferably formed from a hard resin. The chassis 40 is constructed from a plate-like bottom portion 40a having a roughly rectangular-shaped aperture 41 in the center portion thereof and a U-shaped wall portion 40b which stands erect along the left, right and back edge portions of the bottom portion 40a.

Accordingly, no wall portion is formed in the front of the chassis 40 such that the front of the chassis 40 is open. Further, when the mechanism assembly 13 is assembled into the casing 10, the open front portion of the chassis 40 is aligned with the aperture 1 5a of the front panel 15 attached to the casing 10 so that the disc tray 5 can be moved into and out of the main body 2 through the opening 15a.

As shown in FIG. 1, the disc tray 5 is provided with a shallow concave disc supporting portion 5a. The optical disc 3 is to be placed in the disc supporting portion 5a, and then transported to a disc loaded position (disc playback position) under the condition that the optical disc 3 is placed in a prescribed position. Further, in the disc tray 5, there is formed a substantially rectangular shape opening 20 which extends from the roughly central portion of the disc supporting portion 5a of the disc tray 5 toward the rear portion thereof such that a turn table described hereinbelow can be raised through the opening 20 and an optical scanning can be carried out by the optical pick-up through the opening 20.

Figure 4:
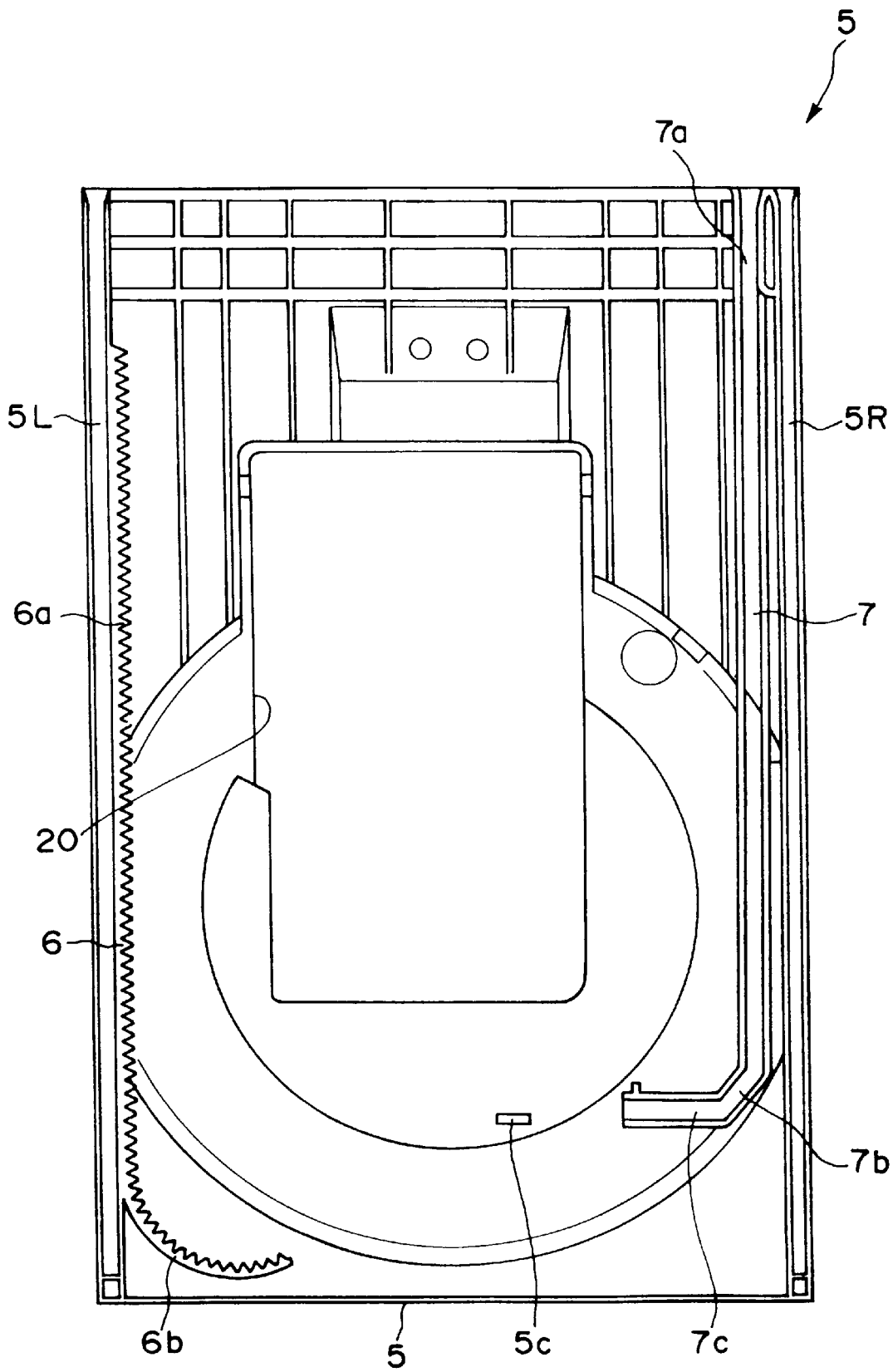
FIG. 4 is a bottom view of the construction of the underside of a disc tray of the disc drive shown in FIG. 1.

As shown in FIG. 4, on the left and right portions of the underside surface of the disc tray 5, there are formed guide grooves 5L, 5R so as to extend in a longitudinal direction (forward and backward direction) of the disc tray 5. These guide grooves 5L and 5R are adapted to slidably engage with protruding guide members 40g (see FIGS. 2 and 3) formed on the left and right side portions of the bottom portion 40a of the chassis 40.

Further, the underside surface of the disc tray 5 is further provided with a rack gear 6 which includes a first rack 6a which extends in a straight line in the forward and backward direction along the guide groove 5L and a roughly 90 degree arc-shaped second rack 6b which is formed at the front end portion (the front side of the disc tray 5, as shown in the lower portion of FIG. 4) of the first rack 6a so as to be continuous therewith.

Furthermore, as shown in FIG. 4, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove 7a.

In this regard, it is to be noted that a rib (protrusion) indicated by the reference numeral 5c in the drawing is a member that is adapted to engage with a disc tray locking portion 55d formed in a cam member 55 (described hereinbelow) for restricting the horizontal movement (forward and backward direction) of the disc tray 5.

Further, as shown in FIGS. 2 and 3, the chassis 40 is provided with a mechanism unit 42. On the mechanism unit 42, there are provided a turntable 46 for rotating the optical disc 3 and an optical pick-up 47 for playing back or recording and playing back the optical disc 3 and others.

The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between a raised position (upper position; FIG. 3) in which the optical disc 3 is supported on the turntable 46 and a lowered position (lower position; FIG. 2) which is lower than the raised position.

In particular, as shown in FIGS. 2 and 3, the mechanism unit 42 includes a base frame 43 which is preferably formed of a hard resin, and a support member (support plate) 44 which is supported on the base frame 43 via elastic members (insulators) 441.

The base frame 43 is formed so as to have a roughly rectangular shape which includes a front portion and a rear portion. In more detail, the base frame 43 comprises a substantially rectangular outer frame 43a and a substantially rectangular inner frame 43b arranged inside the outer frame 43a. The inner frame 43b is one size smaller than the outer frame 43a so as to define a space therearound and its corner portions are formed into an arched shape, respectively. Further, between the outer and inner frames 43a, 43b there is formed a horizontal connecting portion 43c which connects these frames integrally at a position roughly the middle of their height. Furthermore, a plurality of reinforcing vertical ribs are integrally formed on the connecting portion 43c through a predetermined spacing to connect the outer and inner frames integrally. With this result, the base frame 43 is constructed into a so called rudder frame in which the reinforcing vertical ribs 43d are formed on the horizontal connecting portion 43c through a prescribed spacing around the inner frame 43b.

This base frame 43 is formed by injection molding. In this case, if the base frame 43 is formed from a usual mold body made of a hard resin and having a certain thickness, there is a case that deformation would occur when it is cooled after injection molding. However, if the base frame 43 is formed in the form of the rudder frame described above, it is possible to avoid such deformation from occurring and this means that it becomes possible to provide a light base frame having a high strength by injection molding.

Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner wall positions of the chassis 40 defining the opening 41. By supporting the rear portion of the mechanism unit 42 with the axles 431, 432 in this way, the front portion of the mechanism unit 42 is able to move with respect to the chassis 40 between the lowered position shown in FIG. 2 and the raised position shown in FIG. 3 when the mechanism unit 42 (base frame 43) is rotated around the axles 431, 432.

Figure 10:
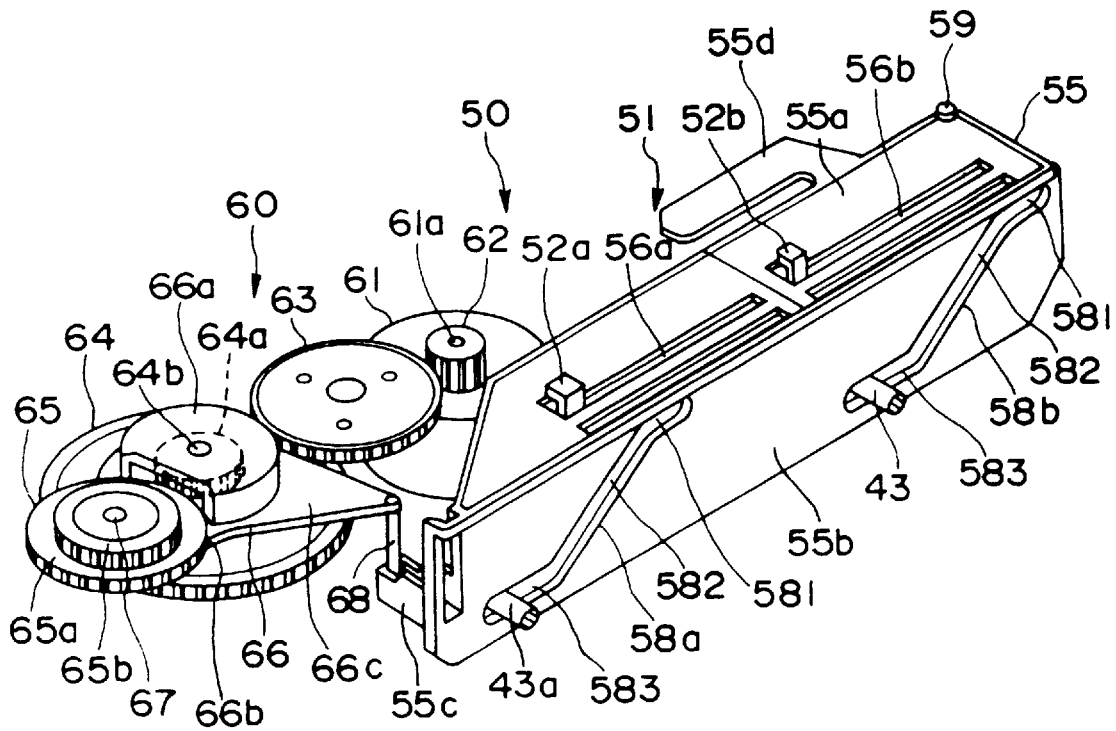
FIG. 10 is a perspective view which shows a structure of a cam mechanism used in the disc drive shown in FIG. 1, in which the cam member is shown in a first position.
Figure 11:
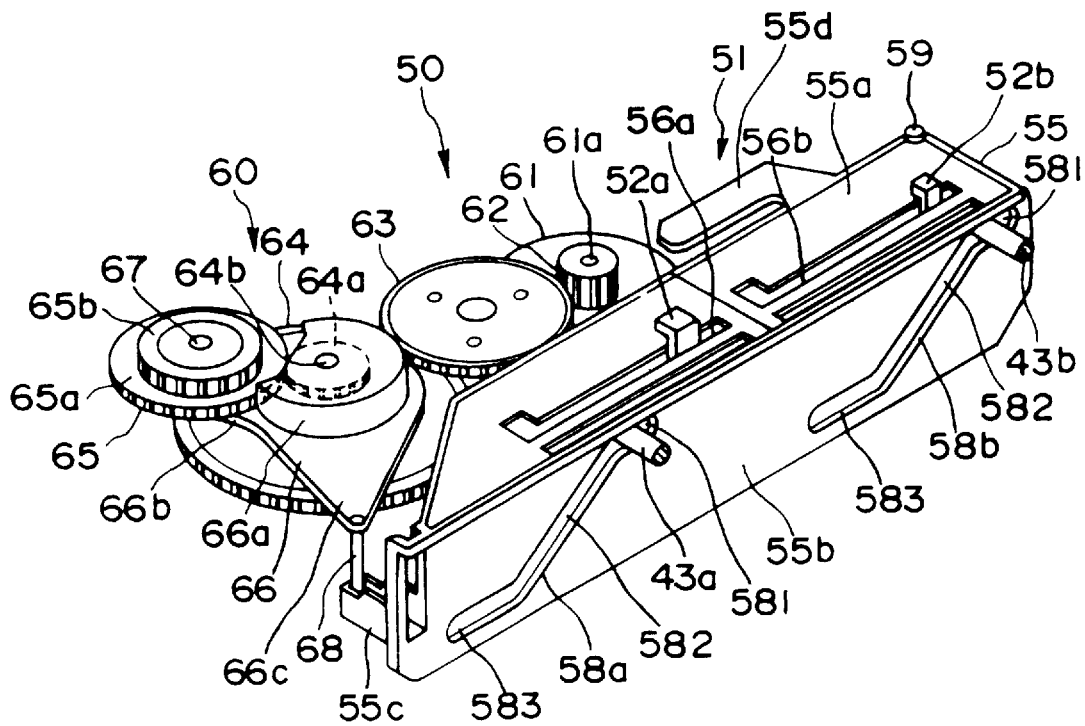
FIG. 11 is a perspective view which shows the structure of the cam mechanism used in the disc drive shown in FIG. 1, in which the cam member is shown in a second position.

Further, a pair of protruding guide pins 430a, 430b are formed on the front of the base frame 43 (See FIGS. 10 and 11). These guide pins 430a, 430b pass through respectively a pair of guide slots (not shown in the drawings) formed in the wall portion of the front portion of the chassis 30 which defines the opening 41 of the chassis 40, and then engage respectively with cam grooves 58a, 58b of the cam member 55 of the cam mechanism 51 described hereinbelow. This enables the front portion of the base frame 43 to be guided up or down in accordance with the displacement of the cam member 55.

Taking possible deformation (thermal deformation or the like) of the chassis 40 into account, a prescribed peripheral spacing 41G is provided between the base frame 43 and wall portions of the chassis 40. Specifically, this spacing 41G is provided around roughly the entire circumference of the base frame 43. In this way, the pivotal movement of the base frame 43 is not hindered even when the chassis 40 undergoes maximum distortion.

The support member 44 is constructed from a roughly rectangular-shaped bottom portion 44a and a wall portion 44b formed around the circumference of the bottom portion 44a. The wall portion 44b is one size smaller than the inner frame 43b of the base frame 43 such that the wall portion 44b is arranged inside the inner frame 43b of the base frame 43 via a prescribed spacing 43G. The support member 44 is supported by the base frame 43 via the elastic members (insulators) 441 provided on tabs 43T formed at the left and right corner portions of the front side of the inner frame 43b of the base frame 43 and on a tab 43T at roughly the middle of the rear portion of the inner frame 43b of the base frame 43. Namely, the support member 44 is supported by the base frame 43 via the elastic members 441 provided at three points which roughly form an isosceles triangle.

Figure 5:
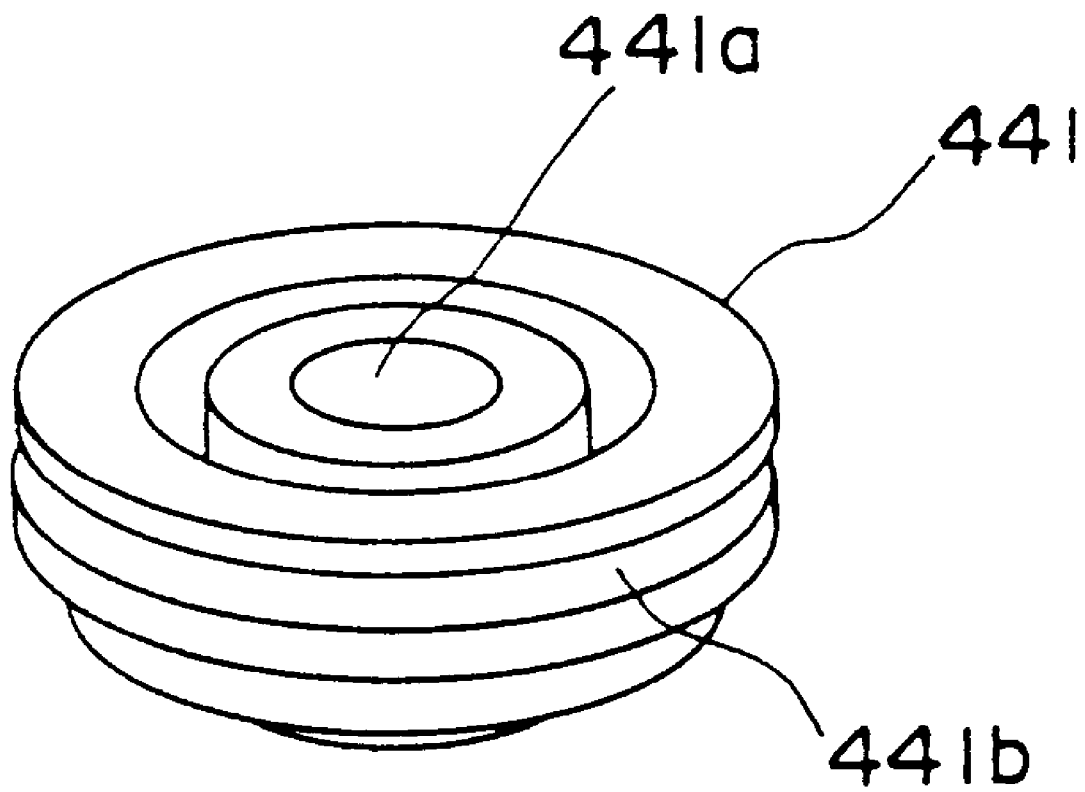
FIG. 5 is a perspective view showing the structure of an elastic member used in the disc drive shown in FIG. 1.

As shown in FIG. 5, each of the elastic members 441, which is formed from an elastic material such as rubber or the like, has a roughly cylindrical shape including a center hole 441a axially formed. On the outer circumferential surface, there is formed a circumferential groove 441b. When the elastic members 441 are arranged in place to support the support member 44 on the base frame 43, the center hole 441a of each elastic member 441 fits onto an axis provided on the respective tabs 43T of the base frame 43 and then the groove 441b fits over a respective notched portion formed at the corresponding position of the support member 44. This construction serves to prevent vibration that is generated by rotation of the spindle motor described hereinbelow from being transmitted to the chassis 40.

Further, as shown in FIGS. 2 and 3, the support member 44 is provided with a spindle motor (not shown in the drawings) for rotating an optical disc 3, a turntable 46 fixed to the rotation shaft 45a of the spindle motor, an optical pick-up 47, and an optical pick-up moving mechanism 48 for moving the optical pick-up 47 in the radial direction of the optical disc 3. The optical pick-up moving mechanism 48 is constructed in the form of a sliding feed mechanism.

Figure 6:
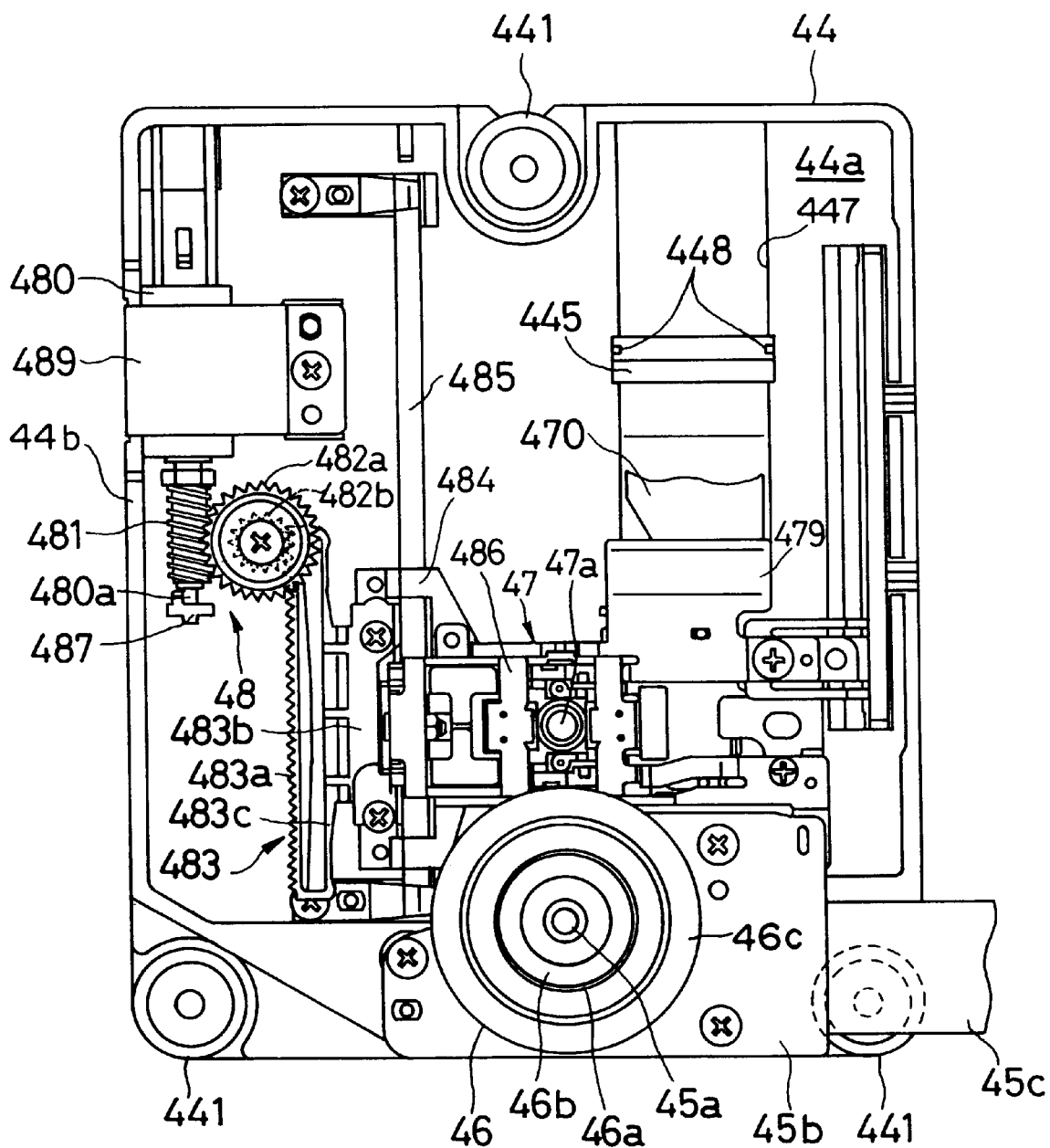
FIG. 6 is a planner view which shows a structure of the sliding feed mechanism (optical pick-up moving mechanism 48) of the disc drive shown in FIG. 1.

As shown in FIGS. 2, 3 and 6, the spindle motor is mounted to a motor support 45b which is made of a metal plate fixed to the support member 44. The spindle motor is capable of rotating the optical disc 3 at a high rotational speed, for example, capable of rotating the optical disc 3 at a speed of 180–3000 rpm. This spindle motor is connected to the printed circuit board through a flat cable 45c.

The turntable 46 is a disc-shaped member which includes a protruding ring-shaped center hub 46a formed in the center portion of the turntable 46. This center hub 46a is adapted to fit into a center hole 3a of the optical disc 3. The center hub 46a is formed so as to taper from the tip to the base in order to prevent the optical disc 3 from slipping off center when placed on the turntable 46. Further, inside the center hub 46, there is provided a spring which allows the center hub 46 to be moved up and down. Furthermore, a ring-shaped permanent magnet 46b for creating an attraction force on a disc damper 80 (described below) is provided in the turn table 46 at a position between the center hub 46a and the rotation shaft 45a of the spindle motor.

Further, a ring-shaped pad 46c is bonded to the upper surface of the turntable 46 (i.e., the side used to support the optical disc 3) around the circumference of the center hub 46a. The pad 46c is made from an elastic material having a relatively high coefficient of friction so as to exhibit a function that prevents the optical disc 3 from slipping. Examples of such a material include various rubbers, soft resins or porous materials (sponges) or the like.

Furthermore, this optical pick-up 47 is a flat type optical pick-up constructed so as to deflect light reflected from the optical disc 3 by roughly 90 degrees using a mirror (or prism) or the like to guide such light toward a light gathering element such as a photodiode or the like. Further, the optical pick-up 47 comprises an object lens 47a and an actuator (not shown in the drawing). As shown in FIG. 6, a flexible printed circuit 470 is connected to the optical pick-up 47 for outputting and inputting various controlling signals. The flexible printed circuit 470 is connected to the circuit board via an opening 445 formed on a concave portion 447 provided in the bottom portion 44a of the support member 44. In FIG. 6, the reference numeral 448 denotes a pair of protrusions to which engaging parts (not shown) formed on the flexible printed circuit 470 are engaged. Further, the reference numeral 479 is a regulating member for regulating an extending direction of the flexible printed circuit 470 from the optical pick-up 47.

As shown in FIGS. 2, 3 and 6, the optical pick-up 47 is movable in the radial direction of the optical disc 3 by the optical pick-up moving mechanism 48 in the form of the sliding feed mechanism.

As illustrated in FIG. 6 in detail, the optical pick-up moving mechanism 48 is roughly constructed from a DC motor (sled motor) 480 capable of forward and reverse rotation, a worm (lead screw) 481 which is mounted to the rotational shaft 480a of the motor 480 and which is formed with a left-hand thread, a worm wheel 482a which meshes with the worm 481, a small-diameter pinion gear 482b which is co-axially formed with the underside surface of the worm wheel 482a, a rack gear 483 which meshes with the pinion gear 482b, a slider (driven means) to which the rack gear 483 is mounted, a guide rod 485 for guiding the slider 484 and a base 486 which is integrally formed on the slider and on which the optical pick-up 47 is provided.

Each of the worm 481, the worm wheel 482a, the pinion gear 482b and the rack gear 483 are formed of a plastic material. Further, the worm 481 and the guide rod 485 are arranged so that their lengthwise directions are directed roughly parallel to the forward and backward direction of the disc drive 1.

As shown in FIG. 6, the rack gear 483 is formed into a structure in which the opposite ends of a rack portion 483a are supported by flexible arms 483b so as to allow deformation toward the guide rod 485. In more detail, the rack gear 483 is constructed from a rack portion 483a having opposite ends, a mounting portion 483c mounted to the slider 484 with screws and flexible arms 483b extending from both sides of the mounting portion 483c and having support ends bent toward the opposite ends of the rack portion 483a, respectively, and these elements are formed of a resin material and formed into a united body. As a result, on the back side of the rack portion 483a, there is formed an elongated space extending substantially in parallel with the guide rod 485, which enables the rack portion 483a to be deformed toward the guide rod 485 in cooperation with the flexibility of the arms.

By constructing the rack gear 483 as described above, even if the worm wheel 482a is forcedly rotated by the worm 481 at either end portions of its movable range corresponding to the movable range of the optical pick-up 47, the rack portion 483a of the rack gear is deformed toward the guide rod 485 to disengage the pinion gear 482b from the rack portion 483a so as to allow the worm wheel 482a to rotate without substantial engagement between the pinion gear 482b and the rack gear 483. As a result, even in such a case, no excessive force is exerted between the worm 481 and worm wheel 482a, it is possible to avoid the situation that the worm 481 is locked upon the worm wheel by meshing interference between the worm 481 and worm wheel 482a.

A combination of the worm 481, the worm wheel 482a, the pinion gear 482b and the rack gear 483 constitutes a rotational speed reducing mechanism of the optical pick-up moving mechanism 48 (sliding feed mechanism), so that the rotational motion of DC motor 480 is transformed into a linear motion of the optical pick-up 47 with reducing the speed. In this way, by rotating the motor 480 in either of forward or reverse direction, it is possible to move the optical pick-up 47 in the radial direction of the optical disc 3.

Specifically, when the rotational shaft 480a of the motor 480 is rotated in the clockwise direction viewed from the tip side of the rotational shaft, the worm wheel 482a is also rotated in the clockwise direction viewed from the upper side of the rotational axis thereof through the worm 481 having the left-hand thread, so that the rack gear 483 is fed forward (toward the turn table). As a result, the optical pick-up 47 is moved toward the inner side of the optical disc from the outer side thereof. On the other hand, when the motor 480 is rotated in a reverse direction, the optical pick-up 47 is moved from the inner side to the outer side. In this connection, it is to be noted that the worm 481 and worm wheel 482a may be formed with a right-hand thread, respectively, and in this case the motion of the pick-up described above is also reversed.

Meanwhile, the rotational shaft 480a of the motor 480 is provided with a small play in its axial direction in order to enable smooth rotation, so that the rotational shaft 480a can be slightly displaced within the play in the axial direction thereof. Therefore, when the rotational shaft 480a of the motor 480 rotates in the anti-clockwise direction (which moves the optical pick-up 47 toward the outer side of the optical disc) viewed from the tip side of the rotational shaft, the worm wheel 482a is also rotated in the anti-clockwise direction viewed from the upper side of the rotational axis. In this state, the rotational shaft 480a of the motor 480 is pulled and slightly displaced toward the tip end thereof within the play due to the rotation of the worm (lead screw) 481.

In the present invention, in order to minimize the axial displacement of the rotational shaft of the motor 480 within the play which is caused by the rotation of the worm 481, there is provided a means 487 for restricting displacement of the rotational shaft (rotational shaft displacement restricting means). This rotational shaft displacement restricting means 487 is provided in front of the tip of the rotational shaft 480a so that the tip of the rotational shaft 480a is abutted thereto to restrict further axial displacement of the rotational shaft 480a when the rotational shaft 480a is axially displaced toward the tip side thereof.

Figure 7:
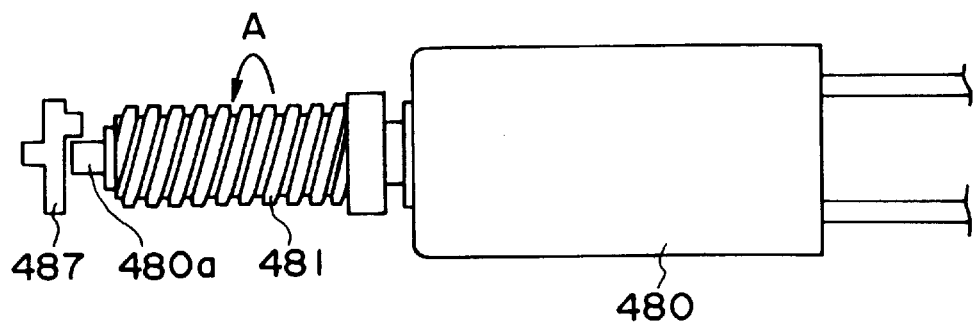
FIG. 7(a) is a planner view which shows a motor used in the sliding feed mechanism.
FIG. 7(b) is an enlarged view which shows the gap between the tip of the rotational shaft of the motor and a stopper member.
Figure 7:
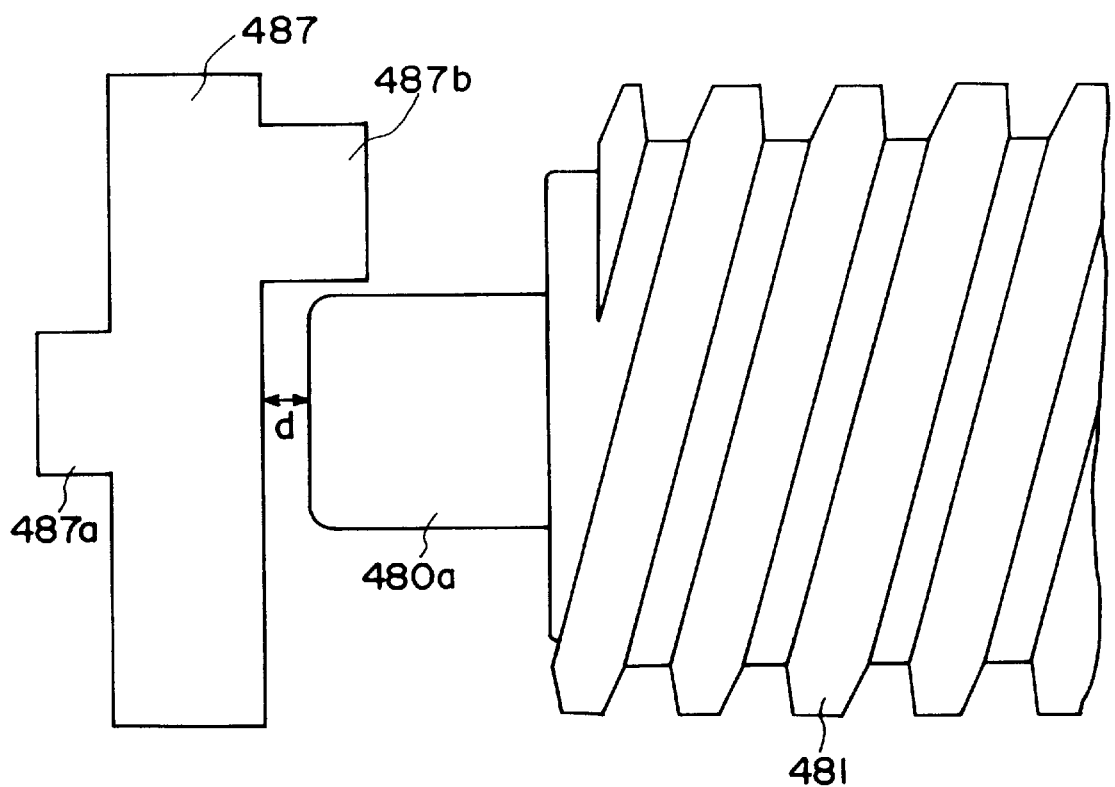

As clearly shown in FIG. 7(a) and FIG. 7(b), the rotational shaft displacement restricting means 487 is constructed from a stopper member 487 which is positioned through a prescribed distance "d" from the tip of the rotational shaft 480a under the condition that the rotational shaft 480a is sifted to the base side thereof within the play. This stopper member 487 is integrally formed with the bottom portion 44a of the support member 44 so as to protrude therefrom such that the tip of the rotational shaft 480a becomes abutted thereto when the rotational shaft 480a is displaced toward tip end due to the rotation of the worm 481.

For this purpose, the prescribed distance "d" is determined to be a size less than the play of the rotational shaft 480a. For example, in the case of a small-size motor such as one used in the optical pick-up moving mechanism of the CD-R drive, the prescribed distance "d" is set to lie within the range of from 0.02 mm to 0.05 mm.

Since the stopper member 487 is pushed when the tip of the rotational shaft 480a is abutted thereto, it is preferred that a reinforcing means is further provided to increase its strength. For example, as shown in FIG. 7(b) it is possible to form a reinforcing rib 487a on the rear surface (surface which does not face the rotational shaft) of the stopper member 487 integrally. Further, it is also possible to form another reinforcing rib 487b on the front surface as shown in FIG. 7(b). This reinforcing rib 487b is provided at a position of the front surface where the rotational shaft 480a of the motor 480 is not abutted.

Figure 8:
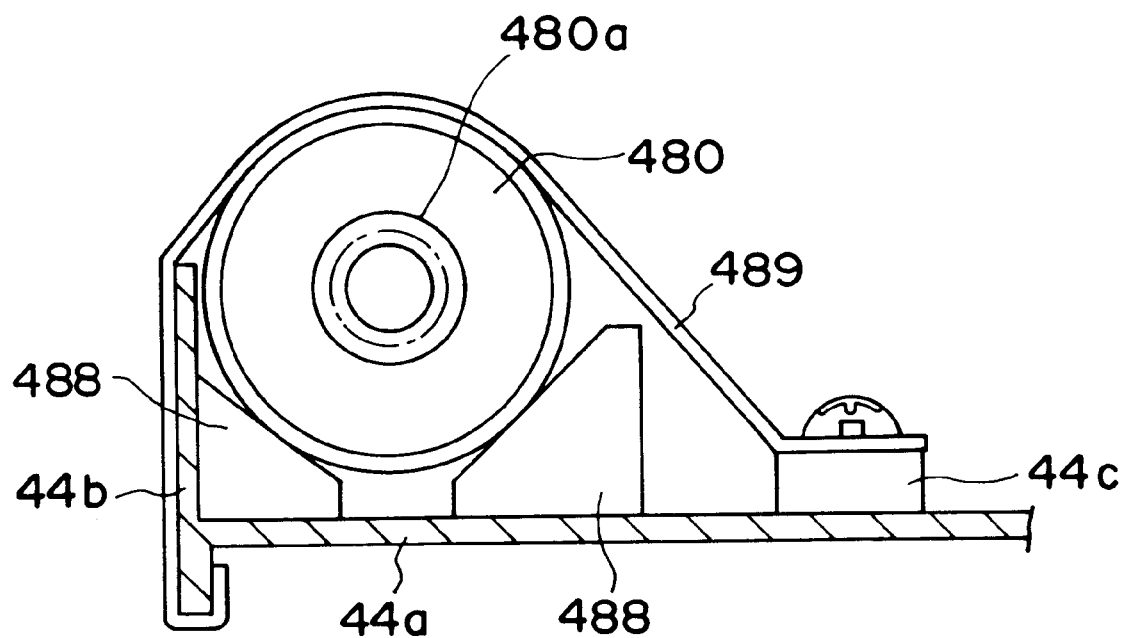
FIG. 8 is a front view which shows the mounting state of the motor.

As shown in FIG. 8, the motor 480 is placed on a pair of supporting members 488 which are integrally formed with the bottom portion 44a of the support member 44. Each of the supporting members 488 is constructed from two pieces arranged so as to form a V-shaped supporting surface. Further, the motor 480 is mounted onto the supporting members 488 by holding the upper portion of the motor 480 with a retaining plate 489 which is formed from a metal plate or the like. Specifically, one end of the retaining plate 489 is bent along the side wall 44b, and its tip portion is formed into a C-shaped hook which is engaged with the lower edge of the side wall 44b. On the other hand, the other end of the retaining plate 489 is mounted onto a mounting portion 44c formed on the bottom portion 44a by means of bosses (or screws, rivets e.t.c.).

When the motor 480 is to be mounted onto the supporting members 488, first the motor 480 is positioned onto the supporting members under the condition that a thin metal plate or the like having a prescribed thickness is interposed between the tip of the rotational shaft 480a of the motor 480 and the stopper member 487. As described above, the thickness of the metal plate is less than the play, for example 0.02 mm to 0.05 mm. Next, the motor 480 is secured onto the supporting members using the retaining plate 489 described above, and then the metal plate which has been interposed between the tip of the rotational shaft 480a and the stopper member 487 is removed therefrom. In this way, it is possible to precisely set the distance between the tip of the rotational shaft 480a and the stopper member 487 so as to be the prescribed distance "d".

Further, the worm 481 of the DC motor 480 and the worm wheel 482a are usually arranged in such a manner that their rotational axes are perpendicular to each other. Moreover, in order to move the optical pick-up 30 properly with high accuracy, each of the worm 481 and the worm wheel 482a is formed so as to have teeth with a small module and a small lead angle. However, in a case where such worm 481 and worm wheel 482a are used, there is a case that the worm 481 is locked up or bitten with the worm wheel 482a due to meshing interference. In such a case, it is no longer possible to restore them their normal meshing state by simply rotating the motor in the reverse direction.

Such a locking state between the worm 481 and the worm wheel 482a can be avoided by constructing the rack gear 483 so that it is elastically deformable toward the guide rod 485 as described above. Another approach is, as shown in FIG. 9(b), to construct the lead angle ($\gamma 1$) of the worm wheel 482a to be larger than the lead angle ($\gamma 2$) of the worm 481 of the DC motor 480 and then to mount the motor 480 is that the rotational shaft 480a of the motor 480 is tilted for an angle $\theta$ with respect to the horizon to achieve a proper meshing between the worm 481 and the worm wheel 482a having the above described lead angle ($\gamma 1$). In this regard, it is to be noted that the worm 481 is formed with a left-hand thread as described above.

Figure 9A:
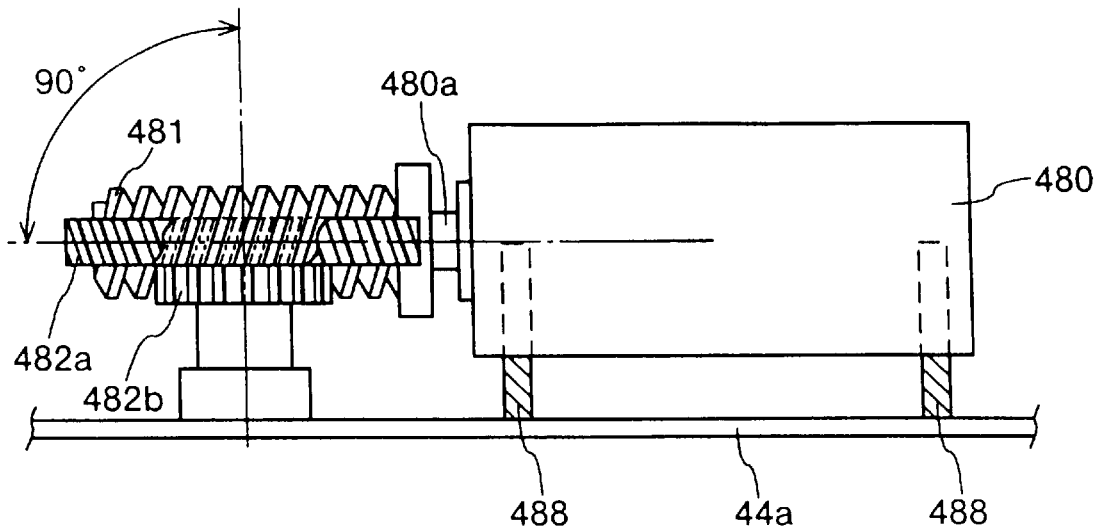
FIG. 9(a) shows meshing condition in the prior art mounting structure of the motor.
Figure 9B:
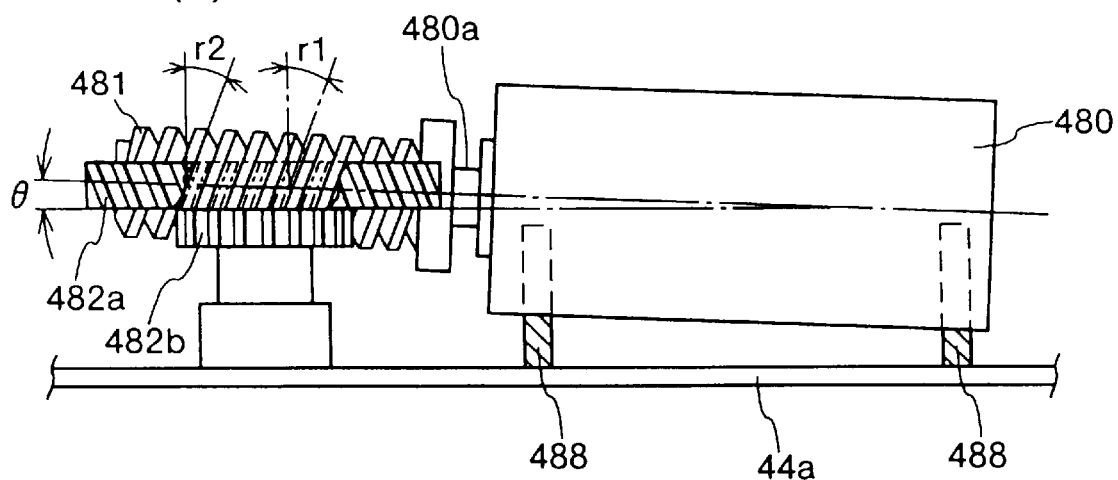
FIG. 9(b) shows meshing condition in a first embodiment of the present invention.
Figure 9C:
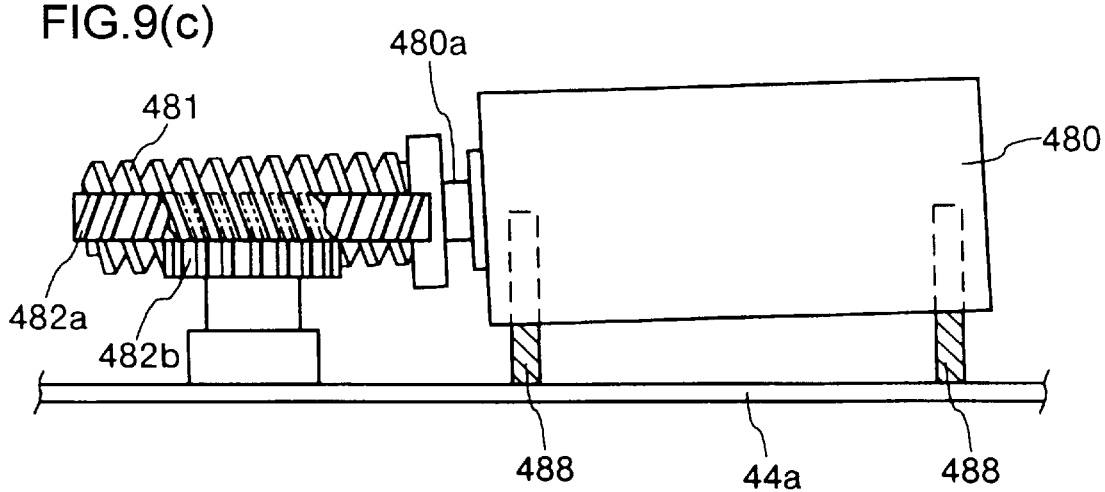
FIG. 9(c) shows meshing condition in another embodiment of the present invention.

By mounting the motor 480 with its rotational shaft 480a being tilted as described above with reference to FIG. 9(b), it becomes possible for the worm 481 to have an apparent lead angle which is larger than the lead angle of the worm 481 shown in FIG. 9(*a*) in spite of using the same worms 481. Further, the lead angle of the worm wheel 482*a* shown in FIG. 9(*b*) is larger than that of the worm wheel 482*a* shown in FIG. 9(*a*). This means that the lead angles of the worm 481 and worm wheel 482*a* become larger. In this way, it becomes possible to reduce slipping when the worm 481 is in mesh with the worm wheel 482*a*, thereby enabling to effectively prevent a locking state from occurring between the worm 481 and the worm wheel 482*a* with the simple construction.

Further, since the worm 481 used in FIG. 9(*a*) is the same as that used in FIG. 9(*a*) and the number of teeth of the worm wheel 482*a* is the same as that shown in FIG. 9(*a*), an amount of the movement of the optical pick-up 47 per one rotation of the rotational shaft 480*a* of the motor 480 is also the same as that shown in FIG. 9(*a*). Accordingly, it is still possible to carry out fine control for the movement of the optical pick-up.

Furthermore, according to this arrangement, the rear portion of the motor 480 can be lowered as shown in FIG. 9(*b*), which creates a space above the rear portion of the motor 480, thus leading to expanding degree of freedom for design.

Practically, in the preferred embodiment shown in FIG. 9(*b*), the lead angle ($\gamma 2$) of the worm 481 is set to 11° 32' 13", and the lead angle ($\gamma 1$) of the worm wheel 482*a* is set so as to be larger than the lead angle ($\gamma 2$) to such an extent of from 2° to 7°, and preferably from 3° to 5°. In this case, the motor 480 is mounted so that its rotation shaft 480*a* is upwardly tilted with respect to horizon for an angle $\theta$ which corresponds to the difference between the lead angles (that is, $\gamma 1 - \gamma 2$). Of course, these angles are not limited to the values described above.

Although in the above embodiment a description is made with regard to an example where a left-hand thread is formed on the worm 481, the present invention is not limited to the example. It is also possible to use a worm 481 having a right-hand thread. In this case, the motor 480 is mounted so that the rotational shaft 480*a* of the motor 480 is tilted downwardly as shown in FIG. 9(*c*).

According to the sliding feed mechanism having the above structure, even if a non-deformable normal rack gear and a low torque small size motor are used, it is possible to provide an optical pick-up moving mechanism 48 in which there is less possibility that a locking state occurs between the worm and the worm wheel.

In this embodiment, the motor 480 is controlled by a controlling means (CPU) provided on the printed circuit board assembly (not shown in the drawing) together with the spindle motor and the loading motor 61 described hereinafter in detail.

In this case, in order to drive the motor with a small voltage at the start of the rotation, it is preferred that the motor 480 is controlled such that its rotational shaft 480*a* is being slightly oscillated by applying high and low pulses to the coil in a predetermined interval. In this way, it is not necessary to apply a large voltage to the motor at the start of the rotation. This is particularly suited for the case where a fine feeding control of the pick-up 47 is required during writing or reading operation being carried out. In the case of the small-size motor which is used in the optical pick-up moving mechanism of the CD-R drive, a pulse voltage of 40 Hz can be applied, for example.

As shown in FIG. 2 and FIG. 3, in front of the mechanism unit 42, there is provided a loading mechanism 50 for displacing the mechanism unit 42 between the lowered position (FIG. 2) and the raised position (FIG. 3) as well as for moving the disc tray 5 between the loaded position and the eject position. This loading mechanism 50 comprises a cam mechanism 51 which is operatively coupled with the mechanism unit 42 and can be moved between a first position (FIG. 2) and a second position (FIG. 3) and a driving mechanism 60 for driving the disc tray 5 and the com mechanism 51.

The cam mechanism 51 can be operated to move the mechanism unit 42 to either the lowered position when the cam mechanism 51 is in the first position shown in FIG. 2, or the raised position when the cam mechanism 51 is in the second position shown in FIG. 3. In more details, as shown in FIGS. 10 and 11, the cam mechanism 51 includes a cam member 55 arranged so as to be slidable between a first position (FIG. 10) and a second position (FIG. 11) in the sideways direction with respect to the chassis 40 (i.e., the direction orthogonal to the direction of movement of the disc tray 5). The cam member 55 is generally constructed from a roughly plate-shaped horizontal portion 55*a* and a plate-shaped vertical portion 55*b* which is integrally formed on the underside surface the horizontal portion 55*a* at a position close to the rear edge (at the side of the mechanism unit) so as to be perpendicular to the horizontal portion 55*a*. That is, the cam member 55 is formed from apart having a roughly T-shaped cross section. This structure can prevent camber from being produced upon cooling process after injection molding of a resin material.

Formed on the horizontal portion 55*a* of the cam member 55 are sideways guide grooves 56*a*, 56*b* which engage respectively with a pair of protrusions 52*a*, 52*b* which protrude from the top of the front portion of the chassis 40. These guide grooves 56*a*, 56*b* are used to guide the cam member 55 between the first and second positions. Further, the underside surface of the horizontal portion 55*a* is provided with an engaging pin (not shown in the drawings) which is inserted into an elongated slot formed in the top of the front portion of the chassis 40. This engaging pin is cooperatively coupled with an emergency eject mechanism 90 (described below).

Further, on the horizontal portion 55*a* of the cam member 55, there is formed a disc tray locking portion 55*d* which is adapted to engage with the rib 5*c* formed on the rear surface of the disc tray 5 when the cam member 55 is displaced from the first position to the second position to restrict the movement of the disc tray 5.

The vertical portion 55*b* of the cam member 55 is positioned to face the front wall which defines the opening 41 of the chassis 40. Formed in the vertical portion 55*b* are a pair of cam grooves 58*a*, 58*b* each having the same shape. Each of the cam grooves 58*a*, 58*b* is formed so as to have a horizontally extending upper groove 581 and lower groove 583 and a slanting groove 582 which connects the upper groove 581 and lower groove 583.

Further, the guide pins (following members) 430*a*, 430*b* which are provided on the front surface of the base frame 43 of the mechanism unit 42 as described above are inserted into the cam grooves 58*a*, 58*b*, respectively. In this way, when the cam member 55 is moved between the first position and the second position, the guide pins 430*a*, 430*b* are moved by the slide abutment with the cam grooves 58*a*, 58*b* in the up and down direction.

Namely, when the cam member 55 is positioned at the first position, the guide pins 430*a*, 430*b* are engaged with the lower grooves 583 (FIG. 10), respectively, and the front portion of the mechanism unit 42 is in the lowered position shown in FIG. 2. When the cam member 55 is moved from the first position to the second position, the guide pins 430a, 430b are moved up by the slanting grooves 582, thereby causing the front portion of the mechanism unit 42 to move from the lowered position toward the raised position. Then, when the cam member 55 reaches the second position, the guide pins 430a, 430b engage with the upper grooves 581 (FIG. 11), and the front portion of the mechanism unit 42 is displaced to the raised position shown in FIG. 3.

Further, a protrusion 59 is integrally formed on an end portion of the horizontal portion 55a of the cam member 55 to engage with the cam member movement restricting groove 7 formed on the underside surface of the disc tray 5. As a result, when the protrusion 59 is engaged with the first movement restricting groove 7a of the disc tray 5, the cam member 55 is prevented from moving in the sideways direction, whereby the cam member 55 is being held at the first position. Then, in accordance with the movement of the disc tray 5 toward the playback position, the protrusion 59 slides from the first movement restricting groove 7a to the second movement restricting groove 7b, and upon moving through the slanting groove of the second movement restricting groove 7b, the cam member 55 is caused to displace within the range of the lower grooves 583 of the cam grooves 58a, 58b of the cam member 55. Then, when the protrusion 59 reaches the position of the third movement restricting groove 7c, the cam member 55 is allowed to move toward the second position.

In this connection, it is to be noted that when the cam member 55 is displaced to the second position, the disc tray locking portion 55d formed on the horizontal portion 55a of the cam member 55 is engaged with the rib 5c formed on the underside surface of the disc tray 5 as described above, thereby the disc tray 5 is restricted to move further, that is the disc tray 5 being locked up.

As shown in FIG. 10 and FIG. 11, the drive mechanism 60 of the loading mechanism 50 comprises a loading motor (DC motor) 61 capable of forward and reverse rotation provided on the underside surface of the front portion of the chassis 40, a pinion gear 62 mounted to a rotation axis 61a of the loading motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64a being integrally formed on top of this cylindrical portion so as to be coaxially therewith. Meshing with the small gear 64a of the third gear 64 is an operative gear 65 which also meshes with the first and second racks 6a, 6b of the disc tray 5. Namely, the operative gear 65 is constructed from a lower gear 65a which meshes with the small gear 64a of the third gear 64, and an upper gear 65b which meshes with the rack 6 of the disc tray 5, in which the upper gear 65b being integrally formed on the same axis as the lower gear 65a.

In this embodiment, the gears 62–65 are flat teeth gears, and a combination thereof constitutes a rotational speed reduction mechanism for the loading motor 61 in the loading mechanism 50.

The operative gear 65 is rotatably mounted to a rotation axis 67 provided on a planetary arm 66, and this planetary arm 66 is rotatably mounted to a rotation axis 64b of the third gear 64. The planetary arm 66 includes a rotation portion 66a which is rotatably fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 described above to which the operative gear 65 is rotatably mounted. Namely, the operative gear 65 rotates about the axis 67 of the first arm 66b which is served as a rotation axis thereof while the operative gear 65 also turns around the axis 64b which is served as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward, and the tip portion of this pin 68 is fitted into an engaging portion 55c formed in the cam member 55.

In this connection, as shown in FIG. 10 and FIG. 11, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the operative gear 65 being held at a prescribed position, and a second operation when engaged with the second rack 6b of the disc tray 5, in which the cam member 55 is moved between the first position and the second position by the movement of the operative gear 65.

Specifically, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, in other words during the time that the disc tray 5 is moving between the eject position and the loaded position, the pin 68 of the second arm 66c of the planetary arm 66 is engaged with the engagement portion 55c of the cam member 55, thereby making it impossible for the planetary arm 66 to be turned around the axis 64b. As a result, the operative gear 65 is being held at a prescribed position while the protrusion 59 of the cam member 55 is engaged with the first movement restricting groove 7a of the disc tray 5. In this state, as shown by the dashed line in FIG. 2, the operative gear 65 engages with the first linear rack 6a of the disc tray 5, whereby the disc tray 5 is moved from the disc eject position to the disc loaded position according to the rotation of the operative gear 65 caused by the rotation of the loading motor 61, and in this way the operative gear 65 functions as a driving gear for moving the disc tray 5.

On the other hand, when the disc tray 5 moves accordingly to a position just before the disc loaded position, the protrusion 59 of the cam member 55 moves from the first movement restricting groove 7a to the second movement restricting groove 7b of the disc tray 5, and this causes the cam member 55 to be displaced in the sideway direction (toward the second position) by a small amount. When the disc tray 5 moves further, the protrusion 59 reaches the third movement restricting groove 7c, whereby the cam member 55 is allowed to move from the first position to the second position. In this state, as shown by the dashed line in FIG. 3, since the operative gear 65 is engaged with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the loading motor 61. Namely, the operative gear 65 acts as a planetary gear.

In accordance with such a turning movement of the operative gear 65, the planetary arm 66 rotates clockwise around the common axis (revolution axis) 64b from the position shown in FIG. 10 to the position shown in FIG. 11, which in turn causes the second arm 66c of the planetary arm 66 to rotate in the same direction. In accordance with this rotation of the second arm 66c, the cam member 55 is driven by means of the pin 68 coupled with the engaging portion 55c, and thereby the cam member 55 moves from the first position shown in FIG. 10 toward the second position shown in FIG. 11. In accordance with this movement of the cam member 55 from the first position toward the second position, the front guide pins 430a, 430b of the base frame 43 of the mechanism unit 42 rise up along the slanting grooves 582, 582, whereby the front portion of the mechanism unit 42 is also displaced from the lowered position shown in FIG. 3 to the raised position shown in FIG. 3.

Figure 12:
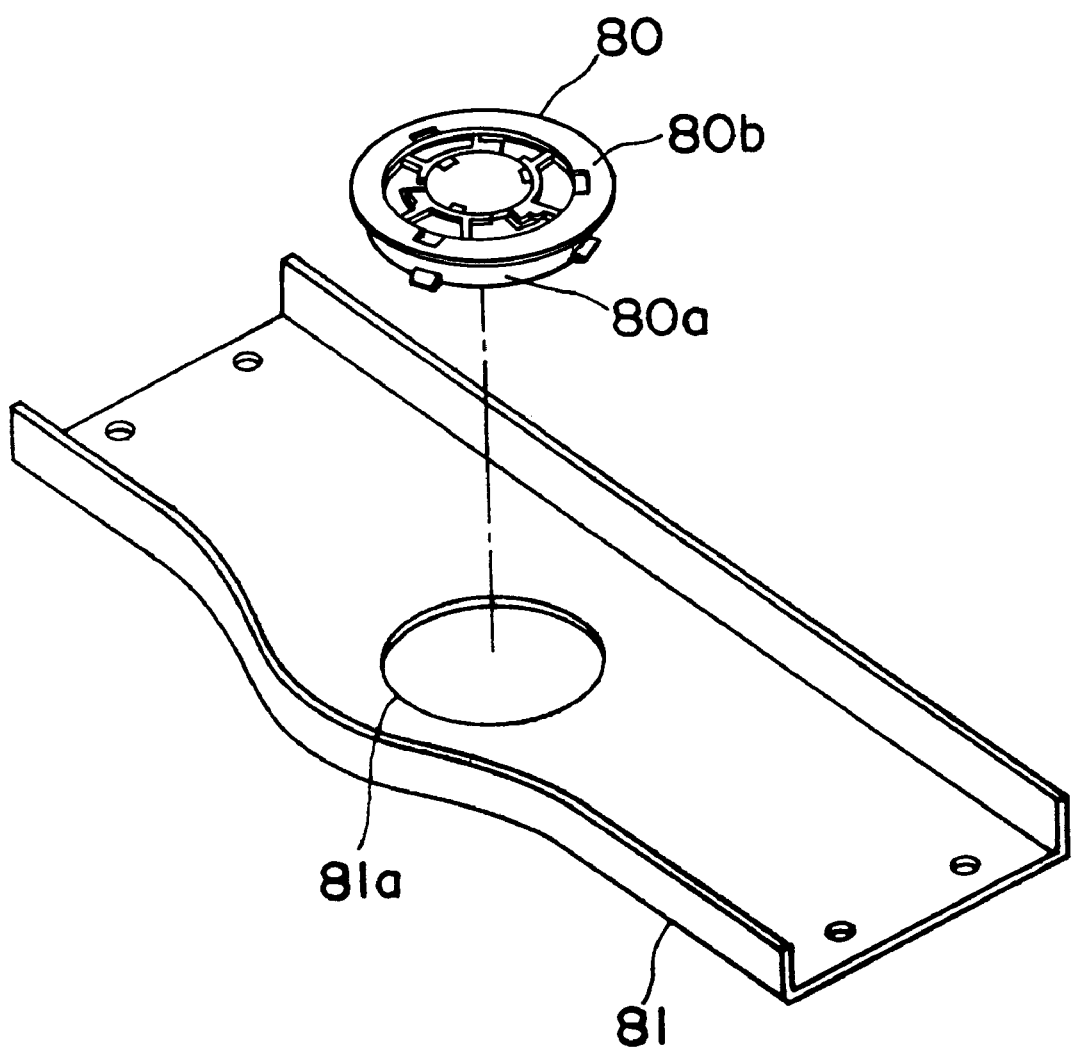
FIG. 12 is a perspective view which shows the structure of a disc clamper used in the disc drive shown in FIG. 1.

A disc clamper 80 is provided on the upper portion of the chassis 40. As shown in FIG. 12, the disc clamper 80 is rotatably supported on the plate-like support member 81 having aperture 81a in the center portion thereof.

In more detail, the support member 81 is mounted onto the chassis 40 in the side-ways direction by being fastened at both ends with bosses (or rivets) to mounting portions 40c of the chassis 40. On the other hand, the disc damper 80 is formed from a flat drum-shaped main body 80a having a bottom portion adapted to be inserted into the opening 81a of the support member 81, and a flange portion 80b which is formed around the upper circumferential portion of the main body 80a. The flange portion 80b is adapted to abut the top of the support member 81. Further, an annular steel attraction member is provided inside the main body 80a such that it is pulled by the permanent magnet provided in the turntable 46.

Further, indicated by the reference numeral 90 in FIG. 2 to FIG. 4 is an emergency eject mechanism for the disc tray 5. This emergency eject mechanism 90 is provided for ejecting an optical disc 3 placed on the disc trays in case the loading motor 61 is disabled to operate due to a power outage or the like while the optical disc 3 is being rotated for playback. Namely, in this emergency eject mechanism 90, a jig is inserted into the main body 2 from the outside to forcedly displace the cam member 55 from the second position to the first position to push out a tip portion of the disc tray 5 from the main body 2, and then the disc tray 5 is manually moved forward to eject the optical disc 3.

Next, a description of the operation of the disc drive 1 will be given below.

When the disc drive 1 is not in use, the empty disc tray 5 is housed inside the casing 10 (inside the main body 2), that is the disc tray 5 is in the disc loaded position (disc play back position). In this state, as shown in FIG. 3, the mechanism unit 42 is in the raised position, the cam member 55 is in the second position shown in FIG. 11, and the protrusion 59 of the horizontal portion 55a of the cam member 55 is in the third movement restriction groove 7c. Further, as shown by the dashed lines in FIG. 3, the operative gear 65 of the drive mechanism 60 is in engagement with an end portion of the second rack 6b which is far away from the first rack 6a.

Now, if an eject operation is carried out, the loading motor 61 will rotate in a prescribed direction, whereby the operative gear 65 is caused to rotate through the rotational speed reduction mechanism. In this state, the operative gear 65 acts as a planetary gear which can be turned around the revolution axis 64b, and in accordance with this revolution, the operative gear 65 moves along the second rack 6b toward the first rack 6a. In accordance with the revolution of the operative gear 65, the planetary arm 66 rotates in the counterclockwise direction about the revolution axis (common axis) 64b. In accordance with the rotation of the planetary arm 66, the second arm 66c causes the cam member 55 to move, via the pin 68, from the second position shown in FIG. 3 (FIG. 11) to the first position shown in FIG. 2 (FIG. 10), whereby the mechanism unit 42 is also moved from the raised position to the lowered position. In this case, while the cam member 55 is moving from the second position to the first position, the protrusion 59 on top of the horizontal portion 55a of the cam member 55 slides along the third movement restricting groove 7c, and reaches the first movement restricting groove 7a via the second movement restricting groove 7b.

At that point, the operative gear 65 moves from the arc-shaped second rack 6b to the linear first rack 6a, and the protrusion 59 of the cam member 55 also moves from the second movement restricting groove 7b to the first movement restricting groove 7a. When the protrusion 59 of the cam member 55 is moved to the first movement restriction groove 7a, the cam member 55 is restricted from moving in the sideways direction, so that the rotation of the planetary arm 66 is also restricted. In this state, the operative gear 65 acts as a driving gear to drive the disc tray 5 with being held at that position. As a result, as shown by the dashed line in FIG. 2, the operative gear 65 engages with the first rack 6a of the disc tray 5, whereby the disc tray 5 is moved from the loaded position to the eject position according to the rotation of the motor 61. In this state, the mechanism unit 42 has been displaced to the lowered position at a prescribed spacing from the disc clamper 80. Accordingly, the disc damper 80 and the turntable 46 do not hinder the eject operation of the disc tray 5.

Now, if a loading operation is carried out by placing the optical disc 3 into the disc supporting portion 5a of the disc tray 5 which has been ejected to the outside through the aperture 15a of the front panel 15, the loading motor 61 will rotate in the reverse direction (i.e., the direction opposite to the direction described above), thereby causing the operative gear 65 to rotate, via the rotational speed reduction mechanism, in the counterclockwise direction (i.e., reverse direction) shown in FIG. 3. Accordingly, the disc tray 5 moves backward (toward the rear of the disc drive) through the aperture 15a to the disc loaded position (playing back position). In this way, the optical disc 3, which is supported at a prescribed position on top of the disc tray 5, is also transported to the disc loaded position inside the main body 2.

During the loading operation of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore unable to move to the second position. Consequently, the planetary arm 66 is held at a prescribed position so as to be unable to rotate. In this state, the operative gear 65 is rotating at that position, so that it acts as a driving gear for driving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, the protrusion 59 of the cam member 55 has moved to the third movement restriction groove 7c via the second movement restriction groove 7b, thereby enabling the cam member 55 to move to the second position, which in turn also makes it possible for the planetary arm 66 to rotate. In this state, the operative gear 65 moves from the first rack 6a to the second rack 6b.

In this state, the movement of the disc tray 5 is restricted while the planetary arm 66 is capable of revolution. Therefore, if the operative gear 65 is rotated by the loading motor 61, the operative gear 65 moves and turns along the arc-shaped second rack 6b around the axis 64b. Therefore, in this state, the operative gear 65 acts as a planetary gear.

When the operative gear 65 acts as a planetary gear and moves along the arc-shaped second rack 6b as described above, the planetary arm 66 also rotates in accordance with the movement of the operative gear 65, around the revolution axis (common axis) 64b in the clockwise direction shown in FIG. 3. When the planetary arm 66 rotates in this way, the second arm 66c of the planetary arm 66 also rotates in the same manner in the clockwise direction, thereby causing the cam member 55 to move from the first position to the second position. With this results, the disc tray locking portion 55c of the cam member 55 is engaged with the rib 5c of the underside surface of disc tray 5.

In accordance with the movement of the cam member 55, the guide pins 430a, 430b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the center hub 46a of the turntable 46 fits into the central hole 3a of the optical disc 3 which is placed on the disc tray 5 and has been transported to the disc loaded position. Then, the disc damper 80 is pulled by the pulling force of the permanent magnet of the turntable 46, and then the optical disc 3 is clamped between the turntable 46 and the disc damper 80.

In this state, if an operation such as a playback operation is carried out, the spindle motor 45 is operated to rotate the turntable 46 in prescribed speeds, thereby making it possible to playback the optical disc 3 or record information thereto. On the other hand, when playback is finished or when playback is stopped in order to switch to another disc, the eject button is pushed after operation of the playback switch (i.e., an operation to stop playback). When this is done, the operation described above for ejecting the disc tray 5 is carried out to eject the disc tray 5 on which the optical disc 3 is placed, to the outside of the main body 2.

Hereinafter, a description is made with regard to an operation of the optical pick-up moving mechanism 48 when playing back or recording the optical disc 3, to which the sliding feed mechanism of the present invention is applied.

First, when the motor 480 is driven to move the optical pick-up 47, the worm 481 is rotated by the rotation of the rotation shaft 480a. In this case, when the motor 480 is stopped, the rotational shaft 480a of the motor 480 is being slightly oscillated by supplying a pulse voltage of about 40 Hz to the coil. Therefore, it is possible to start the motor smoothly without applying a large voltage. When the worm 481 is begun to rotate in the anti-clockwise direction viewed from the tip side of the rotation shaft 480a (toward the direction indicated by A in FIGS. 7(a)), the rotational shaft 480a is displaced toward the tip direction thereof. However, when the rotational shaft 480a is displaced for the prescribed distance "d", it abuts on the stopper 487 and thereby further displacement is restricted.

Further, no resistance is applied to the rotational shaft in the axial direction, since it is not pushed by a leaf spring or the like toward its base end as was done in the prior art. Therefore, since the rotation of the motor 480 becomes smooth, the motor does not need a large torque for rotation. This enables to move the optical pick-up smoothly. As a result, it becomes possible to maintain the objective lens of the optical pick-up at the center of the actuator accurately during the operation of the optical pick-up moving mechanism, thereby improving writing performance of the CD-R drive.

Furthermore, since a large torque is not required for rotation of the motor 480, it is possible to use a small size motor, thus leading to reducing an amount of consumed electrical power. Further, since a space inside the disc drive can be effectively used, it is helpful to reduce the size of the disc drive.

When the worm 481 is rotated by the motor 480 toward the direction indicated by the arrow A in FIG. 7(a), the rotation is transmitted to the slider via the worm wheel 482a, the pinion gear 482b and the rack gear 483 with reducing its rotational speed, so that the slider 484 moves toward the turn table 46 along the guide rod 485. On the other hand, when the worm 481 is rotated in the reverse direction which is opposite to the direction indicated by the arrow A in FIG. 7(a), the rotation of the motor 480 is transmitted in a reversed manner, so that the slider 484 moves toward the direction far away from the turn table 46. In this way, the optical pick-up 47 mounted no the base 486 can be moved along the radial direction of the optical disc 3 placed on the disc tray 5.

In such a disc drive, the movable range of the optical pick-up 47 is restricted between the positions corresponding to the innermost position and the outermost position of the optical disc 3, respectively, and it can not move over the movable range. Therefore, when the optical pick-up 47 reaches at either of such positions, the worm wheel 482a is also brought into a condition that can not rotate further. However, in this state, if the motor 480 is driven to rotate the worm 481 forcedly, there is a case the worm 481 is locked up on the worm wheel 482a due to meshing interference therebetween.

However, in this embodiment, the rack gear 483 is constructed so as to be deformable toward the guide rod 485, the pinion gear 482b integrally formed with the worm wheel 482a is disengaged from the rack gear 483 to enable the worm wheel 482a rotate without substantial engagement with the rack gear 483. As a result, since no excessive form is exerted between the worm 481 and the worm wheel 482a, it is possible to prevent a locking state from occurring between these gears.

Further, in this embodiment, since the teeth of the worm wheel 482a have a relatively large lead angle and the motor 480 is mounted in a slanted manner so that the worm 481 is somewhat tilted, the worm 481 can have an apparent large lead angle. This also makes it possible to prevent such a locking state from occurring. In this case, since no change is added to the number of teeth and the pitch of the worm wheel, an amount of the movement of the optical pick-up 47 per one rotation of the motor is unchanged.

Finally, it is to be understood that the present invention can be applied to not only CD-R drives but also other disc drives such as CD-ROM drives, CD-WR drives, DVD-drives and the like so long as they employ sliding feed mechanisms. However, the present invention can be applied to sliding feed mechanisms used in various machines excepting the disc drives. Further, it is also to be understood that many changes and additions may be made to the embodiments described above without departing from the scope and spirit of the invention defined in the appended claims.

What is claimed is:

1. A sliding feed mechanism having a worm gear for moving an optical pick-up used in an optical disc drive, the mechanism comprising:
    a motor having a rotational shaft having an output end;
    a worm fixedly mounted to the rotational shaft and formed with a left-hand thread;
    a worm wheel which meshes with the worm; and
    a slider on which the optical pick-up is mounted and which is adapted to slidably move according to the rotation of the worm wheel wherein the lead angle of the worm wheel is set so as to be larger than the lead angle of the worm, and the motor is mounted so that the output end of the rotational shaft is upwardly tilted at a predetermined angle so as to provide a proper engagement between the worm and the worm wheel having said lead angle.

2. The sliding feed mechanism of claim 1 wherein if the lead angle of the worm wheel is defined as r1, the lead angle of the worm is defined as $r_2$, and the tilted angle of the rotational shaft is defined as $\theta$, then $r_1$, $r_2$ and $\theta$ satisfy an equation of $r_1=r_2+\theta$ wherein occurrence of a locking state between the worm and the worm wheel is effectively prevented while movement of the slider is finely controlled.

3. The sliding feed mechanism of claim 2 wherein the angle $\theta$ lies within a range of 2° to 7°.

4. The sliding feed mechanism of claim 2 wherein the angle $\theta$ lies within a range of 3° to 5°.

5. The sliding feed mechanism of claim 1 wherein the motor is controlled such that the rotational shaft slightly oscillates when the motor is stopped.

6. The sliding feed mechanism of claim 1 wherein the slider is provided with a rack gear having a rack portion which is in mesh with a pinion gear co-axially provided on the worm wheel wherein the rack gear is formed so as to be deformable.

7. The sliding feed mechanism of claim 6 wherein the rack gear is formed of an elastic material and the rack portion of the rack gear has opposite ends which are supported by flexible arms.

8. A sliding feed mechanism having a worm gear for moving an optical pick-up used in an optical disc drive, the mechanism comprising:
    a motor having a rotational shaft;
    a worm which is fixedly mounted to the rotational shaft and has a predetermined lead angle;
    a worm wheel which has a lead angle larger than the predetermined lead angle of the worm and meshes with the worm; and
    a slider on which the optical pick-up is mounted and which is adapted to slidably move according to the rotation of the worm wheel wherein the motor is mounted with the rotational shaft being tilted at a predetermined angle which is substantially equal to the difference between the lead angle of the worm and the lead angle of the worm wheel.

9. The sliding feed mechanism of claim 8 wherein if the lead angle of the worm wheel is defined as r1, the lead angle of the worm is defined as $r_2$, and the tilted angle of the rotational shaft is defined as $\theta$, then $r_1$, $r_2$ and $\theta$ satisfy an equation of $r_1=r_2+\theta$ wherein occurrence of a locking state between the worm and the worm wheel is effectively prevented while movement of the slider is finely controlled.

10. The sliding feed mechanism of claim 9 wherein the angle $\theta$ lies within a range of 2° and 7°.

11. The sliding feed mechanism of claim 9 wherein the angle $\theta$ lies within a range of 3° and 5°.

12. The sliding feed mechanism of claim 8 wherein the motor is controlled such that the rotational shaft slightly oscillates when the motor is stopped.

13. The sliding feed mechanism of claim 8 wherein the slider is provided with a rack gear having a rack portion which is in mesh with a pinion gear co-axially provided on the worm wheel wherein the rack gear is formed so as to be deformable.

14. The sliding feed mechanism of claim 13 wherein the rack gear is formed of an elastic material and the rack portion of the rack gear has opposite ends which are supported by flexible arms.

15. A sliding feed mechanism having a worm gear, the mechanism comprising:
    a motor having a rotational shaft having an output end;
    a worm fixedly mounted to the rotational shaft and formed with a left-hand thread;
    a worm wheel which meshes with the worm; and
    a driver means which is adapted to slidably move according to the rotation of the worm wheel wherein the lead angle of the worm wheel is set so as to be larger than the lead angle of the worm and the motor is mounted so that the output end of the rotational shaft is upwardly tilted at a predetermined angle with respect to a horizontal position so as to provide a proper engagement between the worm and the worm wheel having said lead angle, and wherein if the lead angle of the worm wheel is defined as $r_1$, the lead angle of the worm is defined as $r_2$, and the tilted angle of the rotational shaft is defined as $\theta$, then $r_1$, $r_2$ and $\theta$ satisfy an equation of $r_1=r_2+\theta$ wherein occurrence of a locking state between the worm and the worm wheel is effectively prevented while movement of the slider is finely controlled.

16. The sliding feed mechanism of claim 15 wherein the angle $\theta$ lies within a range of 2° to 7°.

17. The sliding feed mechanism of claim 15 wherein the angle $\theta$ lies within a range of 3° to 5°.

18. The sliding feed mechanism of claim 15 wherein the motor is controlled such that the rotational shaft slightly oscillates when the motor is stopped.

19. The sliding feed mechanism of claim 15 wherein the slider is provided with a rack gear having a rack portion which is in mesh with a pinion gear co-axially provided on the worm wheel wherein the rack gear is formed so as to be deformable.

20. The sliding feed mechanism of claim 19 wherein the rack gear is formed of an elastic material and the rack portion of the rack gear has opposite ends which are supported by flexible arms.

* * * * *

UNITED STATES PATENT AND TRADEMARK OFFICE
CERTIFICATE OF CORRECTION

PATENT NO. : 6,053,061
DATED : April 25, 2000
INVENTOR(S) : Furukawa et al.

It is certified that error appears in the above-identified patent and that said Letters Patent is hereby corrected as shown below:

```
col. 1  line 62: replace "rotatior" with "rotations"
col. 3  line 13: replace "form" with "from"
col. 12 line 26: replace "apart" with "a part"
col. 16 line 39: replace "damper" with "clamper"
col. 17 line 43: replace "damper" with "clamper"
col. 17 line 46: replace "damper" with "clamper"
col. 18 line 38: replace "no" with "on"
col. 18 line 59: replace "form" with "force"
```

Signed and Sealed this

Twenty-second Day of May, 2001

Attest:

NICHOLAS P. GODICI

Attesting Officer     Acting Director of the United States Patent and Trademark Office